March 2, 1926.
R. G. PETERSON
STOCK WATERER
Filed March 27, 1924
1,574,755
2 Sheets-Sheet 1
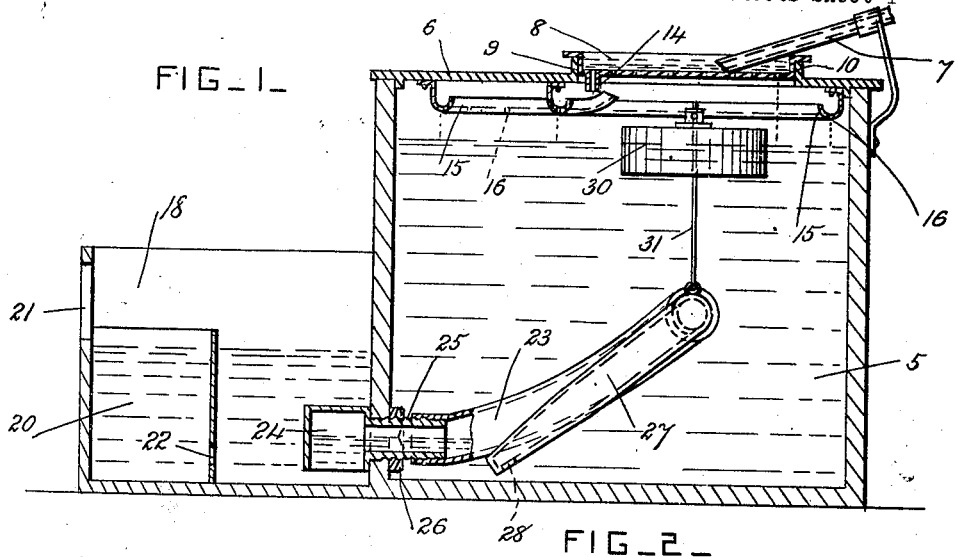
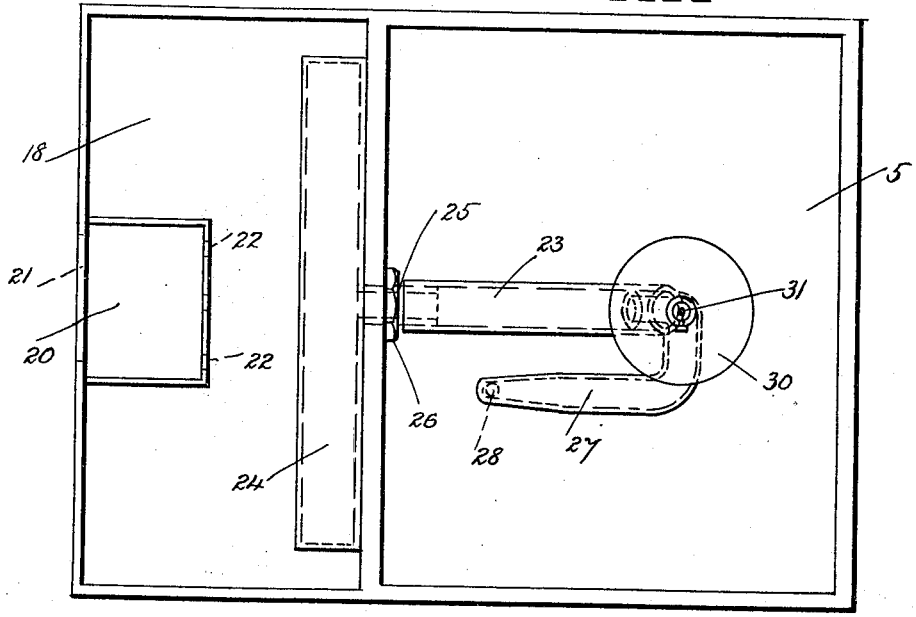
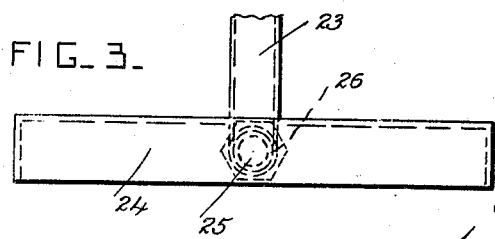
Inventor
Reuben G. Peterson
by Herbert W. Jenner
Attorney.

March 2, 1926.                  R. G. PETERSON                  1,574,755
                                 STOCK WATERER
                              Filed March 27, 1924         2 Sheets-Sheet 2
FIG_4_
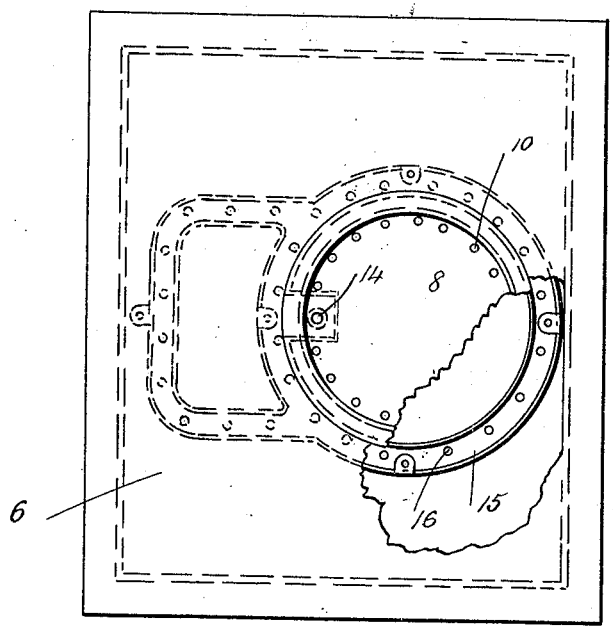

Patented Mar. 2, 1926.

1,574,755

UNITED STATES PATENT OFFICE.

REUBEN G. PETERSON, OF WESSINGTON SPRINGS, SOUTH DAKOTA.

STOCK WATERER.

Application filed March 27, 1924. Serial No. 702,233.

*To all whom it may concern:*

Be it known that I, REUBEN G. PETERSON, a citizen of the United States, residing at Wessington Springs, in the county of Jerauld and State of South Dakota, have invented certain new and useful Improvements in Stock Waterers, of which the following is a specification.

This invention relates to tanks for supplying drinking water to stock; and it consists in the novel construction and combination of the parts hereinafter fully described and claimed, whereby an abundant and substantially uniform supply of water is provided, and whereby the water in the tank is prevented from freezing in cold weather.

In the drawings, Figure 1 is a cross-section of a stock waterer constructed according to this invention. Fig. 2 is a plan view of the same with the cover of the tank removed. Fig. 3 is a detail view of the air vessel in the drinking trough, and the pipe connected to it. Fig. 4 is a plan view of the tank cover, partially broken away to show the sprinkling devices.

A tank 5 is provided having a cover 6, and adapted to hold a supply of clean drinking water. The water flows at intervals into the tank from a pump or other source of supply, through a pipe 7 which delivers it into a perforated sprinkling device. A dished cover 8 is used for closing a manhole 9 in the cover, and has a ring of holes 10 around its edge so that the water is sprinkled onto the water in the tank in a circle, and serves to prevent ice from forming, and to thaw ice, around a float 30 which will be more fully described hereinafter. The water in the dished cover or from the pipe may also be led into a nozzle 14 which projects through a hole in the tank cover and delivers it into an annular sprinkling trough 15 having holes 16 which sprinkle the water in a larger ring than the holes in the man-hole cover 8, and with a similar effect. The sprinkling trough 15 is extended so as to sprinkle the water in the tank around the inlet nozzle 27 hereinafter described. When the water in the tank is low, and freezes in the night, the thin ice is broken and thawed by the impact and higher temperature of the water pumped into the tank in the morning to fill it. This removes the ice around the float and other parts and permits them to function properly.

The water from the closed tank is conducted into a drinking trough 18 built along one side of it, and which is open at the top so that cattle can drink from it. A compartment 20 is formed in the trough at any convenient point, and a hole 21 is formed above the compartment in the side of the tank so that hogs can drink out of the compartment without fouling the water for the cattle. One or more holes 22 are formed in the side of the compartment near its bottom, so that the water in the trough and in the compartment stand at the same level.

An air vessel 24 is arranged in the trough, and is of great length in proportion to its width and height. It is open at the bottom, and is secured by a tubular stem 25 and nut 26 in a hole in the side wall of the tank. A hose pipe 23 of flexible material is secured to the stem 25 and an inlet nozzle 27 is connected to the free end of the hose pipe. The nozzle 27 projects at an angle to the hose pipe, and its free end portion is tapered and is provided with an inlet hole 28 of relatively small size on its lower side nearest to the bottom of the tank. A float 30 is provided in the tank, and is connected to the nozzle 27 by a cord or chain 31 which can be adjusted to any desired length. The float is arranged in the tank concentric with the annular sprinkling device, and is kept in place by the hose pipe and nozzle which permit it to slide vertically. The inlet end of the nozzle hangs somewhat below its outlet end and the upper end of the hose pipe, so that air is retained in the inlet nozzle, and in the air vessel.

The flow of water from the tank is controlled chiefly by the length of the cord or chain 31, which determines the distance between the float and the upper or inlet end of the pipe 23. The resistance of the water in the pipe 27 always balances the pressure of the corresponding head of water inside the tank. The pipe 23 contains air and the resistance of this air is controlled by the resistance of the water in the drinking trough. The inlet hole 28 is of predetermined small size and also assists in controlling the flow of water. When the pressure due to the head of water in the tank above the level of the inlet end of pipe 23 is greater than the resistance due to the head of water in the trough 18, the water is forced through the inlet opening 28, and trickles in a small stream down the pipe 23 without displacing the air in it, and finally increases the supply of water in the drinking trough. When the cord or chain 31 is made too long the drinking trough will overflow, and it is made of a length found to give the best result. The float holds the inlet end portion of the flexible pipe at a predetermined constant distance below the level of the water in the tank. The pipe 23 is flexible for the whole of its length, or for sufficient of its length to give it the requisite flexibility to rise and fall with the float.

The water in the drinking trough is kept at a preferred level by the action of the float. The earth is banked up around the closed tank and drinking trough so that the water in them seldom freezes, and it is rarely necessary to do any more than break the ice in the drinking trough and its compartment to water the cattle and hogs. If thin ice should form in the tank the sprinkling device will prevent it from obstructing the float.

The inlet nozzle may be bent around at an angle to the hose pipe until its free end portion is parallel to the hose pipe.

What I claim is:

1. In a stock waterer, a supply tank, a drinking trough for cattle having at one side a drinking opening for hogs, means for automatically regulating the delivery of water from the tank to the drinking trough, and a compartment for hogs to drink from arranged inside the drinking trough below and adjacent to the said opening and having a water inlet opening in its lower part which communicates with the drinking trough, said tank and compartment having one side common to both and the top edges of the said compartment being extended above the level of the bottom edge of the said drinking opening for hogs.

2. In a stock waterer, a supply tank provided with a cover having a man-hole, a dished lid closing the man-hole and having a ring of holes which form an annular sprinkling device, an annular trough arranged in the tank and also provided with holes and arranged concentric with the said lid, means for admitting water to the said lid and trough, a drinking trough, and means for admitting water from the tank to the drinking trough provided with a float arranged concentric with the annular sprinkling device.

3. In a stock waterer, a supply tank, a drinking trough, an air vessel open at the bottom and arranged in the drinking trough and having a tubular stem which projects into the said tank, a flexible hose pipe secured to the said stem, an inlet nozzle secured to the hose pipe, said nozzle being provided with an inlet hole of predetermined small size in its free end portion, and a float in the supply tank for sustaining the inlet nozzle.

4. In a stock waterer, a supply tank, a drinking trough, an air vessel open at the bottom and arranged in the drinking trough and having a tubular stem which projects into the said tank, a flexible hose pipe secured to the said stem, an inlet nozzle secured to the hose pipe, said nozzle being arranged at an angle to the hose pipe and provided with a tapering end portion having an inlet hole of predetermined small size at its lower side, and a float in the supply tank connected with the inlet nozzle and sustaining it with its inlet end below the level of its outlet end.

5. In a stock waterer, a supply tank, a drinking trough, a tubular stem operatively connecting the tank and trough, a flexible hose pipe secured to the said stem inside the tank, an inlet nozzle secured to the hose pipe and provided with an inlet hole of predetermined small size in its free end portion, and a float in the tank connected with the other end portion of the said nozzle.

6. A stock waterer as set forth in claim 5, and having also an air vessel connected with the said tubular stem and the said trough and operating to compensate for slight variations in the level of the water in the said trough.

7. In a stock waterer, a supply tank, a drinking trough, a flexible pipe arranged inside the tank and communicating at its outlet end with the drinking trough, an inlet nozzle secured to the inlet end of the flexible pipe and having an inlet opening at its free end, and a float connected to the inlet end portion of the flexible pipe and operating to sustain it at a predetermined distance below the level of the water in the tank.

8. A stock waterer as set forth in claim 7, and having also an air vessel interposed between the outlet end of the said flexible pipe and the drinking trough.

9. The combination, with a supply tank for water provided with a drinking trough, of means for automatically regulating the flow of water from the tank to the trough, said means being provided with a float in the tank, and a sprinkling device for delivering water onto the water in the tank around the said float to hinder the formation of ice on the water.

In testimony whereof I have affixed my signature.

REUBEN G. PETERSON.